US009451786B2

(12) United States Patent
Townsend et al.

(10) Patent No.: US 9,451,786 B2
(45) Date of Patent: Sep. 27, 2016

(54) DILUTABLE PRODUCTS

(75) Inventors: Gerald William Townsend, Hawkes Bay (NZ); David John Fellowes, Napier (NZ); Caroline Emma Clarke, Auckland (NZ); Simon James Walter Shaw, Auckland (NZ)

(73) Assignee: H.J. Heinz Company Brands LLC, Pittsburgh, PA (US)

( * ) Notice: Subject to any disclaimer, the term of this patent is extended or adjusted under 35 U.S.C. 154(b) by 2540 days.

(21) Appl. No.: 11/418,457

(22) Filed: May 5, 2006

(65) Prior Publication Data

US 2006/0286256 A1 Dec. 21, 2006

Related U.S. Application Data

(63) Continuation-in-part of application No. 11/347,583, filed on Feb. 6, 2006, now abandoned, which is a continuation-in-part of application No. PCT/NZ2004/000147, filed on Jul. 12, 2004.

(30) Foreign Application Priority Data

Aug. 6, 2003 (NZ) ........................................ 527423
Nov. 10, 2003 (NZ) ........................................ 529449

(51) Int. Cl.
   *A23L 1/40* (2006.01)
(52) U.S. Cl.
   CPC ........................................ *A23L 1/40* (2013.01)
(58) Field of Classification Search
   USPC ........................................ 426/589
   See application file for complete search history.

(56) References Cited

U.S. PATENT DOCUMENTS

| 3,604,689 | A | * | 9/1971 | Hutcheson et al. | .......... 366/109 |
| 3,676,154 | A | | 7/1972 | Glasser et al. | |
| 4,140,809 | A | | 2/1979 | Glasser et al. | |
| 4,190,477 | A | * | 2/1980 | Ossian et al. | ............ 156/244.11 |
| 4,291,066 | A | | 9/1981 | Anema et al. | |
| 5,538,749 | A | * | 7/1996 | Shimp | ........................ 426/589 |
| 6,376,004 | B1 | | 4/2002 | Kuil et al. | |

FOREIGN PATENT DOCUMENTS

| EP | 0 012 465 A1 | 6/1980 | |
| JP | 52020199 A | * 2/1977 | ............. B65D 75/14 |
| JP | 55-081600 A | 6/1980 | |
| JP | 62-025959 A | 2/1987 | |

OTHER PUBLICATIONS

Potter et al, Food Science 5th Edition Chapman and Hall 1995, pp. 138, 139, 152, 153, and 478.*
E.P.O. Office action, mail date is Mar. 21, 2013, pp. 1-6.

* cited by examiner

*Primary Examiner* — Kelly Bekker
(74) *Attorney, Agent, or Firm* — Fitch Even Tabin & Flannery LLP (57) ABSTRACT

A retorted liquid soup concentrate package (of about 70 to 100 g contents) expressible from the package when opened and dilutable with boiling or near boiling water (at a dilution ratio water/concentrate of from 1.9:1 to 2.5:1) to a lump free ready to eat soup form at at least 55° C. (preferably 60 to 65° C.) and a target volume less than 400 mls (preferably 250-300 mls).

22 Claims, 2 Drawing Sheets

GENERIC FLOW DIAGRAM - INSTANT WET SOUP SACHET PROJECT

KEY

*AREAS MARKED WITH "##" AND/OR IN RED TEXT*
These are of key importance because of the concept of this product

*AREAS MARKED WITH "#" AND/OR IN BLUE TEXT*
These are not unique in being importance because of the concept- they would need to be considered for any soup project, but they are more significant than usual because of it.

*UNMARKED AREAS- IN BLACK TEXT*
Little or no additional consideration is required because of the concept- their consideration is common to all soup products.

DILUTABLE PRODUCTS

CROSS-REFERENCE TO RELATED APPLICATIONS

This is a continuation-in-part of Ser. No. 11/347,583 filed Feb. 6, 2006 which in turn is a continuation-in-part of PCT/NZ2004/000147 filed 12 Jul. 2004 and published in English.

BACKGROUND OF THE INVENTION

The present invention relates to marketable products capable of being conveniently converted to a hot ready to serve form.

BRIEF SUMMARY OF THE INVENTION

There is an increasing emphasis on convenience in the preparation of foods. This is also the case with soup products.

Dry powder type soups are known. These frequently require either (i) mixing with cold water and thereafter heating or (ii) mixing with hot water. Care is required particularly with option (ii) to ensure some degree of consistency without lumps in the resultant product.

We perceive a premium attaching to packaged wet soup forms where at least some (and preferably most) of the content has been in line puree or broth derived. Such a wet soup type product has the prospect of being marketed as originating from natural components with a minimum of unnecessary or out of line processing steps.

Such a packaged wet concentrate product that we envisage (and this excludes instant dry powder soup product forms) desirably will not require a final heating step on a stove top in a microwave or the like. We envisage such a product as benefiting from an ability to be out of package diluted with boiling water or the like to a hot ready to serve form.

The present invention accordingly recognises the desirability of providing and has as an object the provision of a liquid including concentrate of a soup, which can preferably be removed from a container for dilution with hot water to an instant hot "ready to serve" form.

As used herein the term "and/or" means "and" or "or" or where appropriate both.

As used herein the term "(s)" following a noun means as is appropriate the singular or plural or both forms of that noun.

As used herein the term "ready to serve" means a soup ready to consume.

As used herein the term "in line" in respect of a food stuff and/or food stuff flavouring derived from one or more of the group consisting of vegetables, fruits, fungi, mammalian and poultry meats, fish and shellfish means a procedure akin to that of a normal start to finish cooking procedure, i.e.; without being processed to a dry powder form. For example (optionally with the addition of at least water), in the case of vegetables and fruits, it can involve the preparation of a puree that is never totally dried and, in the case of meats, fish and shellfish, can include the preparation of a broth that is never totally dried which yet which, in each case, with optional water content reduction and/or free water absorption and/or other viscosity and/or perceived viscosity treatment, can nonetheless be filled into an appropriate container in a suitable temperature range (ideally cold or cool filled if any viscosity and/or perceived viscosity increasing agent(s) may give rise to undue thickening within the container if hot filled), be sealed therein and still later be diluted with boiling water to some targeted viscosity or perceived viscosity.

The present invention in one aspect involves a wet soup in a container capable of reconstitution with hot water to provide an instant soup. Examples include 70-100 g wet soup sachets (e.g. foil sachets) capable of being reconstituted with added boiling water in a mug to form a ready to eat hot soup.

In another aspect the invention is a marketable product comprising or including a sealed container, a liquid including concentrate adapted to be diluted by boiling or near boiling water to a ready to serve form, the concentrate being within the container, wherein said concentrate is capable of being expressed, poured or otherwise removed from the container once opened, and wherein the concentrate without heating and at an ambient temperature within the range 10 to 30° C. can, if desired, be diluted with boiling water in a volume in excess to that of the liquid including concentrate thereby to achieve a soup to a target volume less than 400 mls at a temperature of at least 55° C.

Preferably the dilution ratio of water to concentrate on a weight basis is to be at least 1.5:1 and more preferably at least 1.9:1.

Preferably the dilution ration of water to concentrate is in the range 1.5:1 to 5:1 and most preferably 1.9:1 to 2.5:1.

Preferably said target volume is from 200 to 350 mls (and most preferably 250-300 mls).

The concentrate is preferably from 70 g to 100 g.

Preferably the concentrate is to a weight of about 85 g.

Preferably the concentrate has been cool or cold filled into the container prior to the sealing thereof.

In one preferred form the product is a soup.

In another aspect the invention is a retorted product comprising or including a sealed retortable container, a liquid including concentrate of from 70 to 100 g that has been retorted in the container and which is adapted to be diluted by boiling or near boiling water to a ready to serve form, wherein said concentrate is capable of being expressed, poured or otherwise removed from the container once opened as instructed on the container, and wherein the concentrate has a volume and a specific heat characteristic such that without heating and at an ambient temperature within the range 10 to 30° C. it can, if desired, be diluted with boiling or near boiling water to achieve a soup to a target volume less than 400 mls at a temperature of at least 55° C.

Preferably the dilution ration of water to concentrate is in the range 1.5:1 to 5:1 and most preferably 1.9:1 to 2.5:1.

In another aspect the invention is a marketable product comprising or including a sealed container, a liquid including puree and/or broth derived concentrate adapted inherently or by way of content inclusion to be diluted by boiling or near boiling water to a ready to serve form, the concentrate being within the container, wherein said concentrate is capable of being expressed, poured or otherwise removed from the container once opened, and wherein the concentrate without heating and at an ambient temperature within the range 10 to 30° C. can, if desired, be diluted with boiling water in a volume in excess to that of the liquid including concentrate thereby to achieve a soup to a target volume less than 400 mls at a temperature of at least 55° C.

Preferably the dilution ratio of water to concentrate on a weight basis is to be at least 1.5:1 and more preferably at least 1.9:1.

Preferably the dilution ration of water to concentrate is in the range 1.5:1 to 5:1 and most preferably 1.9:1 to 2.5:1.

Preferably said target volume is from 200 to 350 mls and most preferably 250-300 mls.

Preferably the concentrate is to a weight of about 85 g.

Preferably the concentrate has been cool or cold filled into the container prior to the sealing thereof.

Preferably the concentrate is retorted in the container and/or includes content adapted to enable a desired shelf life without bacterial and/or fungal proliferation beyond acceptable limits.

In another aspect the invention is a retorted marketable product comprising or including
a sealed container,
a liquid including concentrate adapted to be diluted by boiling or near boiling water, the concentrate having been cold or cool (e.g. at ambient temperatures) filled into the container prior to sealing and retorting,
wherein said concentrate is capable of being expressed, poured or otherwise removed from the container once opened,
and wherein the concentrate without heating and at an ambient temperature within the range 10 to 30° C. can, if desired, be diluted with boiling water in a volume in excess to that of the liquid including concentrate thereby to achieve a soup to a target volume less than 400 mls at a temperature of at least 55° C.

Preferably the dilution ratio of water to concentrate on a weight basis is to be at least 1.5:1 and more preferably at least 1.9:1.

Preferably the dilution ration of water to concentrate is in the range 1.5:1 to 5:1 and most preferably 1.9:1 to 2.5:1.

Preferably said soup volume is from 200 to 350 mls (and most preferably 250-300 mls).

Preferably the concentrate is to a weight of about 85 g.

Preferably the concentrate has been cool or cold filled into the container prior to the sealing thereof.

In yet another aspect the invention is a retorted marketable product comprising or including
a sealed container,
a liquid including concentrate adapted to be diluted by boiling or near boiling water, the concentrate being within the container,
wherein said concentrate is capable of being expressed, poured or otherwise removed from the container once opened,
and wherein the concentrate without heating and at an ambient temperature within the range 10 to 30° C. can, if desired, be diluted with boiling water in a volume in excess to that of the liquid including concentrate thereby to achieve a substantially lump free soup to a target volume less than 400 mls at a temperature of at least 55° C.,
and wherein the container bears instructions to dilute the content of the container with boiling (or near boiling water) to provide such a soup.

Preferably the instruction is to provide a cup or near cup size volume.

Preferably the dilution ratio of water to concentrate on a weight basis is to be at least 1.5:1 and more preferably at least 1.9:1.

Preferably the dilution ration of water to concentrate is in the range 1.5:1 to 5:1 and most preferably 1.9:1 to 2.5:1.

Preferably said target volume is from 200 to 350 mls and most preferably 250-300 mls.

Preferably the concentrate is to a weight of about 85 g.

Preferably the concentrate has been cool or cold filled into the container prior to the sealing thereof.

In still another aspect the invention is a marketable product comprising or including
a sealed container,
a water including concentrate adapted to be diluted by boiling or near boiling water, the concentrate being within the container and the concentrate including as a texturiser and/or thickener at least one of (i) a suitable starch and/or starch derivative and (ii) a suitable fruit and/or vegetable fibre,
wherein said concentrate is capable of being expressed, poured or otherwise removed from the container once opened,
and wherein the concentrate has been retorted in the container,
and wherein the concentrate without heating and at an ambient temperature within the range 10 to 30° C. can, if desired, be diluted with boiling water or near boiling water to achieve a target soup volume within the range of from 200 to 350 mls at a temperature of at least 55° C.

Preferably the dilution ration of water to concentrate is in the range 1.5:1 to 5:1 and most preferably 1.9:1 to 2.5:1.

Preferably the temperature will be at least 60° C.

Preferably the temperature will be from 60 to 65° C.

Preferably the concentrate has been cool or cold filled into the container prior to the sealing thereof Preferably the mass of the concentrate is from 50 to 100 gms (preferably about 80 to 90 gms and more preferably about 85 gms).

Optionally the component (i) is present.

Optionally, instead or as well as (i), the component (ii) is present and is either or both (a) a dry citrus fibre and/or (b) a pomace or derivative thereof.

Preferably the pomace or pomace derivative is that of apple.

In even another aspect the invention is a retorted marketable product comprising or including
a sealed container,
a water including concentrate adapted to be diluted by boiling or near boiling water, the concentrate being within the container having been cold or cool (e.g. at ambient temperatures) filled into the container prior to retorting and the concentrate including as a texturiser and/or thickener at least one of (i) a suitable starch and/or starch derivative and (ii) a suitable fruit and/or vegetable fibre,
wherein said concentrate is capable of being expressed, poured or otherwise removed from the container once opened,
and wherein the concentrate has been retorted in the container,
and wherein the concentrate without heating and at an ambient temperature within the range 10 to 30° C. can, if desired, be diluted with boiling water or near boiling water to achieve a target soup volume substantially lump free within the range of from 200 to 350 mls at a temperature of at least 55° C.

Preferably the dilution ration of water to concentrate is in the range 1.5:1 to 5:1 and most preferably 1.9:1 to 2.5:1.

Preferably the temperature will be at least 60° C.

Preferably the temperature will be from 60 to 65° C.

Preferably the concentrate has been cool or cold filled into the container prior to the sealing thereof.

Preferably the mass of the concentrate is from 50 to 100 gms (preferably about 80 to 90 gms and more preferably about 85 gms).

Optionally the component (i) (i.e. starch or starch derivative) is present.

Optionally, instead or as well as (i), the component (ii) (i.e. suitable fruit and/or vegetable fibre) is present. It can (a) a dry citrus fibre and/or (b) pomace or pomace derivative and/or a fibre such as that of the tomato.

In a further aspect the invention is a retorted marketable product comprising or including a sealed container, a water and suitable starch or starch derivative including concentrate adapted to be diluted by boiling or near boiling water, the concentrate being within the container, wherein said concentrate is capable of being expressed, poured or otherwise removed from the container once opened, and wherein the concentrate without heating and at an ambient temperature within the range 10 to 30° C. can, if desired, be diluted with boiling water in a volume in excess to that of the liquid including concentrate thereby to achieve a substantially lump free soup to a target volume less than 400 mls at a temperature of at least 55° C.

Preferably the dilution ratio of water to concentrate on a weight basis is to be at least 1.5:1 and more preferably at least 1.9:1.

Preferably the dilution ration of water to concentrate is in the range 1.5:1 to 5:1 and most preferably 1.9:1 to 2.5:1.

Preferably said volume is from 200 to 350 mls (and most preferably 250-300 mls).

Preferably the concentrate is to a weight of about 85 g.

Preferably the concentrate has been cool or cold filled into the container prior to the sealing thereof.

In another aspect the invention is a retorted marketable product comprising or including a sealed container, a water and pomace, pomance fibre or pomace fibre derivative including concentrate adapted to be diluted by boiling or near boiling water, the concentrate being within the container, wherein said concentrate is capable of being expressed, poured or otherwise removed from the container once opened, and wherein the concentrate without heating and at an ambient temperature within the range 10 to 30° C. can, if desired, be diluted with boiling water in a volume in excess to that of the liquid including concentrate thereby to achieve a substantially lump free soup to a target volume less than 400 mls at a temperature of at least 55° C.

Preferably the dilution ratio of water to concentrate on a weight basis is to be at least 1.5:1 and more preferably at least 1.9:1.

Preferably the dilution ration of water to concentrate is in the range 1.5:1 to 5:1 and most preferably 1.9:1 to 2.5:1.

Preferably said target volume is from 200 to 350 mls and most preferably 250-300 mls.

Preferably the concentrate is to a weight of about 85 g.

Preferably the concentrate has been cool or cold filled into the container prior to the sealing thereof.

In another aspect the invention is a retorted marketable product comprising or including a sealed container, a water including concentrate adapted to be diluted by boiling or near boiling water, the concentrate being within the container and the concentrate including as a texturiser and/or thickener at least one of (i) a suitable starch or starch derivative and (ii) a suitable fruit or vegetable fibre, wherein said concentrate is capable of being expressed, poured or otherwise removed from the container once opened, and wherein the concentrate has been retorted in the container, and wherein the concentrate without heating and at an ambient temperature within the range 10 to 30° C. can, if desired, be diluted with boiling water or near boiling water to achieve a target soup volume substantially lump free within the range of from 200 to 350 mls at a temperature of at least 55° C., and wherein the container bears instructions to dilute the content of the container with boiling (or near boiling water) to provide such a soup.

Preferably the dilution ration of water to concentrate is in the range 1.5:1 to 5:1 and most preferably 1.9:1 to 2.5:1.

Preferably the temperature will be at least 60° C.

Preferably the temperature will be from 60 to 65° C.

Preferably the concentrate has been cool or cold filled into the container prior to the sealing thereof.

Preferably the mass of the concentrate is from 50 to 100 gms (preferably about 80 to 90 gms and more preferably about 85 gms).

Optionally the component (i) is present.

Optionally, instead or as well as (i), the component (ii) is present and is either or both (a) a dry citrus fibre and/or (b) a pomace or pomace derivative fibre and/or (c) a fibre such as that of the tomato.

In another aspect the invention is a retorted marketable product comprising or including a sealed container, a water and citrus fibre including soup concentrate adapted to be diluted by boiling or near boiling water, the concentrate being within the container, wherein said concentrate is capable of being expressed, poured or otherwise removed from the container once opened, and wherein the concentrate without heating and at an ambient temperature within the range 10 to 30° C. can, if desired, be diluted with boiling water in a volume in excess to that of the liquid including concentrate thereby to achieve a soup to a target volume less than 400 mls at a temperature of at least 55° C., and wherein the container bears instructions to dilute the content of the container with boiling (or near boiling water) to provide such a soup.

Preferably the dilution ratio of water to concentrate on a weight basis is to be at least 1.5:1 and more preferably at least 1.9:1.

Preferably the dilution ration of water to concentrate is in the range 1.5:1 to 5:1 and most preferably 1.9:1 to 2.5:1.

Preferably said volume is from 200 to 350 mls (and most preferably 250-300 mls).

Preferably the concentrate is to a weight of about 85 g.

Preferably the concentrate has been cool or cold filled into the container prior to the sealing thereof.

In even another aspect the invention is a marketable product comprising or including a sealed container, a water and citrus fibre including concentrate adapted to be diluted by boiling or near boiling water, the concentrate having been cold or cool filled into the container prior to sealing and retorting, wherein said concentrate is capable of being expressed, poured or otherwise removed from the container once opened, and wherein the concentrate without heating and at an ambient temperature within the range 10 to 30° C. can, if desired, be diluted with boiling water in a volume in excess to that of the liquid including concentrate thereby to achieve a soup to a target volume less than 400 mls at a temperature of at least 55° C., and wherein the container bears instructions to dilute the content of the container with boiling (or near boiling water) to provide such a soup.

Preferably the dilution ratio of water to concentrate on a weight basis is to be at least 1.5:1 and more preferably at least 1.9:1.

Preferably the dilution ration of water to concentrate is in the range 1.5:1 to 5:1 and most preferably 1.9:1 to 2.5:1.

Preferably said target volume is from 200 to 350 mls and most preferably 250-300 mls.

Preferably the concentrate is to a weight of about 85 g.

Preferably the concentrate has been cool or cold filled into the container prior to the sealing thereof.

In another aspect the invention is a marketable product comprising or including a sealed container, a water including concentrate adapted to be diluted by boiling or near boiling water, the concentrate being within the container and the concentrate including as a texturiser and/or thickener at least one of (i) a suitable starch or starch derivative and/or (ii) a suitable fruit or vegetable fibre, wherein said concentrate is capable of being expressed, poured or otherwise removed from the container once opened, and wherein the concentrate has been retorted in the container, and wherein the concentrate without heating and at an ambient temperature within the range 10 to 30° C. can, if desired, be diluted with boiling water or near boiling water to achieve a target soup volume within the range of from 200 to 350 mls at a temperature of at least 55° C.

Preferably the dilution ration of water to concentrate is in the range 1.5:1 to 5:1 and most preferably 1.9:1 to 2.5:1.

Preferably the temperature will be at least 60° C.

Preferably the temperature will be from 60 to 65° C.

Preferably the concentrate has been cool or cold filled into the container prior to the sealing thereof.

Preferably the mass of the concentrate is from 50 to 100 gms (preferably about 80 to 90 gms and more preferably about 85 gms).

Optionally the component (i) is present.

Optionally, instead or as well as (i), the component (ii) is present and is either or both (a) a dry citrus fibre and/or (b) a pomace or pomace derivative and/or (c) a fibre such as that of the tomato.

In another aspect the invention is a packaged wet form food and retorted concentrate where the concentrate itself is capable of dilution with boiling water, or near boiling water, to the form of a ready to serve soup, said concentrate comprising or including a food stuff and/or food stuff flavouring derived from one or more of the group consisting of vegetables, fruits, fungi, mammalian and poultry meats fish and shellfish, water (whether added and/or inherently in any ingredient), a viscosity and/or perceived viscosity increasing ingredient or ingredients, optionally a bulking and/or texturising ingredient or ingredients, optionally a flavouring agent or flavouring agents, optionally an emulsifier or emulsifiers, optionally a preservative or preservatives, optionally a colouring agent or agents, optionally a stabiliser or stabilisers, and optionally a pH adjustment agent or agents.

Preferably the dilution ration of water to concentrate is in the range 1.5:1 to 5:1 and most preferably 1.9:1 to 2.5:1.

In another aspect the invention is a packaged and retorted wet form food concentrate where the concentrate itself is capable of dilution with boiling water, or near boiling water to the form of a ready to serve soup, said concentrate comprising or including a food stuff and/or food stuff flavouring in line derived from one or more of the group consisting of vegetables, fruits, fungi, mammalian and poultry meats, fish and shellfish, water (whether added and/or inherently in any ingredient), a viscosity and/or perceived viscosity increasing ingredient or ingredients, optionally a bulking and/or texturising ingredient or ingredients, optionally a flavouring agent or flavouring agents, optionally an emulsifier or emulsifiers, optionally a preservative or preservatives, optionally a colouring agent or agents, optionally a stabiliser or stabilisers, and optionally a pH adjustment agent or agents.

Preferably the dilution ration of water to concentrate is in the range 1.5:1 to 5:1 and most preferably 1.9:1 to 2.5:1.

Preferably the concentrate has been retorted.

Preferably in said packaged wet form food concentrate said food stuff and/or food stuff flavouring is distinct from the viscosity and/or perceived viscosity increasing ingredient or ingredients although in some forms, particularly those based upon a tomato puree, the same ingredient can give rise to satisfying both requirements.

Preferably said concentrate is of a soup and the mass of the concentrate in the package is less than 100 gms (most preferably about 85 gms).

In some forms of the present invention the packaged wet form food concentrate may not be retorted in which case preferably it is in a substantially sterile form owing to the inclusion of a preservative or preservatives and/or appropriate pH adjustment agent or agents.

Preferably whatever form of the concentrate preferably it includes a viscosity at the time of packaging that enables the filling of the package and the subsequent sealing thereof, the opening and expression from the package of the concentrate at an ambient temperature (such as between 10 to 30° C. inclusive) and/or the dilution of the concentrate with hot water to a soup consistency where the viscosity in that diluted form is that desirable for a soup of that kind.

Viscosity and/or perceived viscosity increasing agent(s) are selected preferably from the following:

Starches:
Native
Physically modified
Chemically modified
From origins Wheat, Potato, Corn, Waxy Maize, Tapioca
Gums, Etc.:
Locust Bean Gum
Pectins (inc. different types)
MCC CMC
Guar
Other:
Citrus Fibre
Pea Flour
Pumpkin Powder
Other dried fibres (cereal, vegetable, fruit)
Fat mimetic
Wet vegetable purees Some of these options can also act as bulking and/or texturising and/or free water absorption agents.

In some forms of the present invention the viscosity and/or perceived viscosity increasing ingredient or ingredients can include an ingredient adapted to absorb water of the concentrate thereby bestowing a perceived viscosity increasing effect. Examples of such an agent is a dry citrus fibre (for example, any one or more of lemons and/or oranges) or fibres such as those of the tomato.

In other forms however the agent can be one that modifies the physical form of the concentrate by a gel or other forming characteristic that directly or indirectly has an effect on viscosity and/or perceived viscosity.

Such gel providing agents can include appropriate starches capable of being used in a procedure which does not generate excessive gel or thickening prior to filling of the container and its sealing and/or post such filling and sealing and prior to expression or pouring or otherwise being removed from the container.

It should be appreciate that it is envisaged desirable to allow the container to be emptied prior to mixing with the hot water although, in some less preferred forms, if desired, the container can have provision for receiving the dilution volume in total or in part prior to the expression, pouring or other removal from the container of the fully or partly diluted product.

Preferably the parameters of viscosity are any of those hereinafter described.

We envisage a desirability of being able to express or otherwise remove the concentrate for a soup from a container (such as a retortable container such as a retort pouch pack) to immediately be diluted in a cup, bowl, jug with boiling, or near boiling water, to provide, with a minimum of lump development, a final ready to serve product.

Because we perceive an advantage in requiring no further heating apart from the sensible heat captured in the water to provide the dilution, the sensible heat to be transferred to the mass of the concentrate preferably must deliver the diluted product to a consumable temperature.

An ideal temperature we envisage for such a ready to eat soup is in the range of at least 55° C. and, most preferably from 60 to 65° C. We envisage that with boiling water and a water including concentrate (and taking into account the likely heat loss into a cup or other such container at ambient temperatures) the ratio of boiling water or near boiling water to concentrate on a weight for weight basis must be at least 1.9:1.

We have also determined that a desirable serving size, if to provide a soup, is in the range of 250 to 300 ml and for dilution to an optimal serving temperature, we envisage a preferred mass of the concentrate to be of the order of about 85 g.

In still another aspect the present invention is a process for in line producing a concentrate in a container capable of dilution with boiling or near boiling water to a hot ready to serve soup, said process comprising or including the steps of
preparing a dilutable wet concentrate puree and/or broth of an ingredient or ingredients selected at least from
(i) the group consisting of vegetables, fruits, fungi, mammalian and poultry meats, fish and shellfish, and optionally also (ii) one or more viscosity and/or perceived viscosity increasing agent, and
filling and sealing a quantity of the dilutable wet concentrate into a suitable container, (and optionally retorting the container sealed concentrate), the process being further characterised by any one or more of:
  (ii) the mass of the concentrate in the container is from 70 to 100 gms (preferably about 85 gms),
  (iii) the concentrate is cold or cool filled into the container prior to its sealing,
  (iv) the concentrate without the heating and at an ambient temperature within the range 10 to 30° C. can, if desired, be diluted with boiling water in a volume in excess to that of the liquid including concentrate thereby to achieve a soup, to a target volume less than 400 mls at a temperature of at least 55° C.,
  (v) the dilution instructed on the pack provides at least a ready to serve soup of a temperature and viscosity appropriate for such a soup, and/or
  (vi) the sealed concentrate has been retorted.

In a further aspect the present invention consists in a product made by a process as aforesaid.

In still a further aspect the present invention consists in the use of a product and/or concentrate of any form in accordance with the present invention, such use involving dilution with boiling or near boiling water.

Ideally such use is with boiling water but having regard to the heat sink that a container such as cup, bowl, jug or the like may provide the temperature can be below boiling provided however the hot water is initially at boiling or at a temperature preferably within 10 and most preferably a few degrees of boiling.

Preferred forms of the present invention will now described with reference to the accompanying drawings in which.

BRIEF DESCRIPTION OF THE DRAWINGS

DETAILED DESCRIPTION OF THE INVENTION

In the preferred form of the present invention the container is preferably a retort pouch type pack rather than other container forms. Nevertheless it is still within the scope of the present invention to include containers which can be a can or the like.

A suitable retortable pouch pack is that known as the Greenseas Pouch albeit preferably with modification to shape to aid product removal after opening (e.g. by cutting, tearing, etc.).

The concentrate of the present invention is to be readily reconstituted to the correct dilution and serving temperature by the addition of an instructed volume of boiling water (e.g. on the package, by means of instruction to empty into a cup and fill the cup with stirring with boiling water).

The pack size will be in the range 70 g to 100 g (about 85 g) which can be made to a (preferably 200 to 350 ml (e.g. 300 ml)) serving with boiling water to reach a desired temperature at least 55° C. and preferably around 65° C.

Tomato based concentrates we have found to provide suitable viscosity characteristics for this type of product. Tomato paste lends itself to this application well as it readily dilutes with hot or cold water without any tendency to form lumps. It is also very temperature stable.

Another content suitable for providing such viscosity and textural characteristics is the use of fruit (eg. Tomato) and vegetable fibres. Such products are used currently in drink and food formulations. Their properties include some independence to temperature and acidity. These fibres are available as commercial preparations or directly from food-grade waste. Such content alone or in conjunction with conventional thickeners, such as starches and gums (or any other suitable means), can provide the textural and mouthfeel characteristics some products require.

Any product developed to meet aims for products of our invention, because of the large amount of water to be added by the consumer, requires as little as possible water addition during manufacture. One way of controlling free water in a recipe whilst conferring textural advantages is the addition of citrus fibre.

With respect therefore to the annexed drawing (FIG. 1) the following considerations of the process are to be kept in mind.

Figure 1:
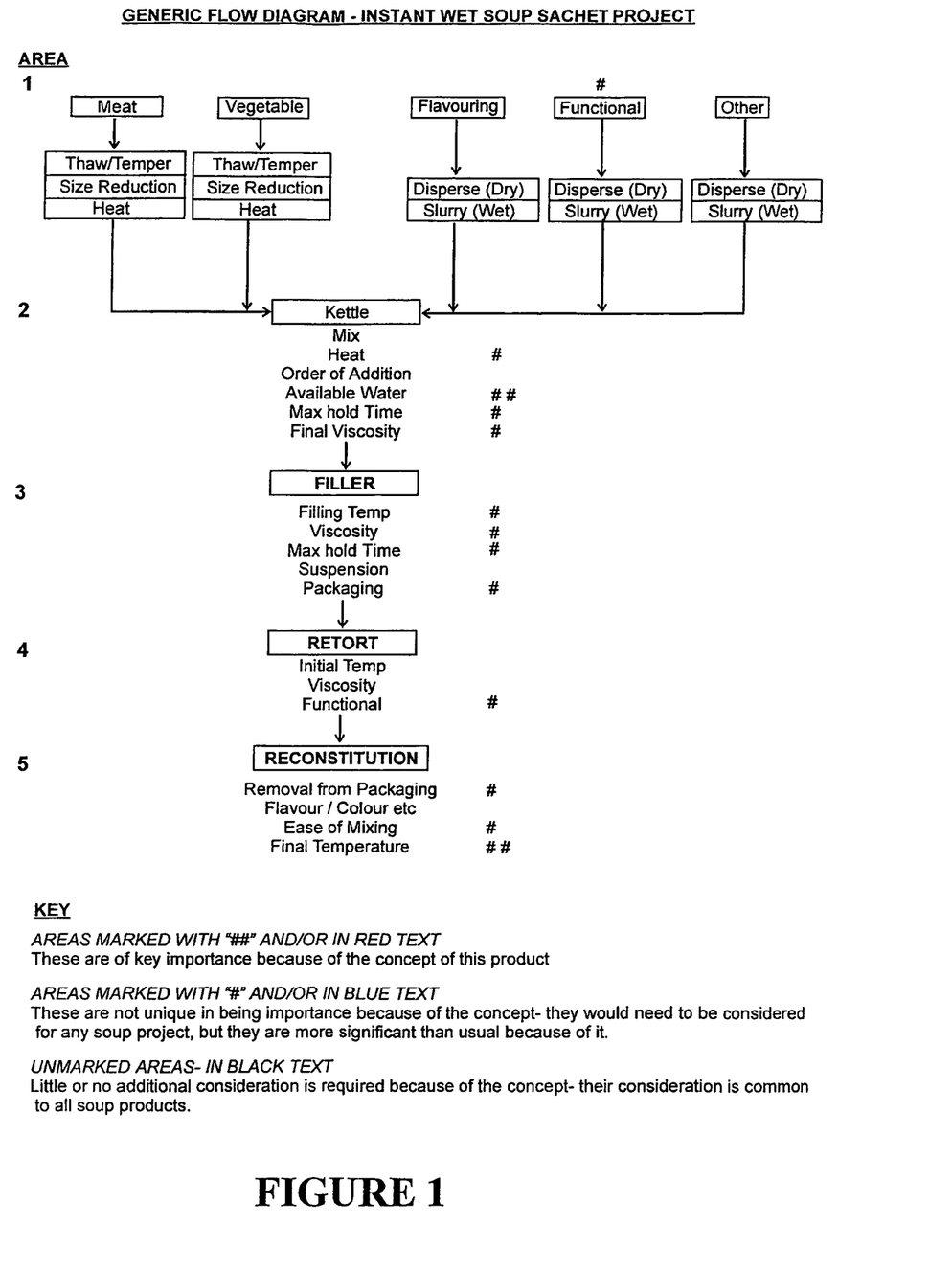
FIG. 1 is a generic flow diagram of the process of the present invention.

Area Notes:
1. Ingredients:
(A) General
Colour/Flavour Delivery
Effect on Viscosity
Requirements for Preparation before the kettle stage.
(B) Functional Ingredients:
Presence of starch as a post process thickener only
Citrus fibre as a water rententive agent
Some flavouring ingredients are also functional (e.g. tomato paste)
Need to slurry starch, slurry other dries if water availability allows
Higher starch levels cause problems with reconstitution
Functional ingredients can be limited in use by their organoleptic character
2. At the Kettle:
Which ingredients need cooking? (micro/enzymic/flavour)
Which ingredients are fragile and need to be added last/reduced mixing speed?
How well will the ingredients integrate? (fat/lumping/sink/float)
How thick will the mix be after each addition? (try to thicken late)
Do we have water available to slurry/wash out skips/thin mix for pumping?
What effect does heat have on functional/other ingredients?
What is the final viscosity (can we pump it?—At any given temperature)
What limits are there on hold time (change in viscosity/micro stability/flavour/colour)
Temperature maintenance during transfer?
Need to keep kettle temps below 60° C. if starch is used—else thickens too much.
3. At the Filler:
Need to keep filler temps below 60° C. if starch is used—else thickens too much
Particle suspension
Product separation/thickening
Maximum hold times (as at kettle)
Limitations imposed by packaging format?
Headspace
Weight control
Temperature maintenance during filling
Must work within viscosity limits of factory preparation/transfer capability.
4. Thermal Processing:
Initial Temperature
Initial Viscosity
Final Viscosity
Protection of product quality
Attainment of commercial sterility (depends acidity/initial loading of ingredients)
5. Reconstitution/Consumption:
Higher starch levels cause problems with reconstitution
Ease of reconstitution with boiling water
Homogeneity of mix achieved (no lumps)
Adequate final temperature is achieved by a minimum 1:1.9 ratio of product:boiling water
Flavour/Texture/Colour etc.
Ease of Removal from pouch—often the limiting factor for final product thickness.

Figure 2:
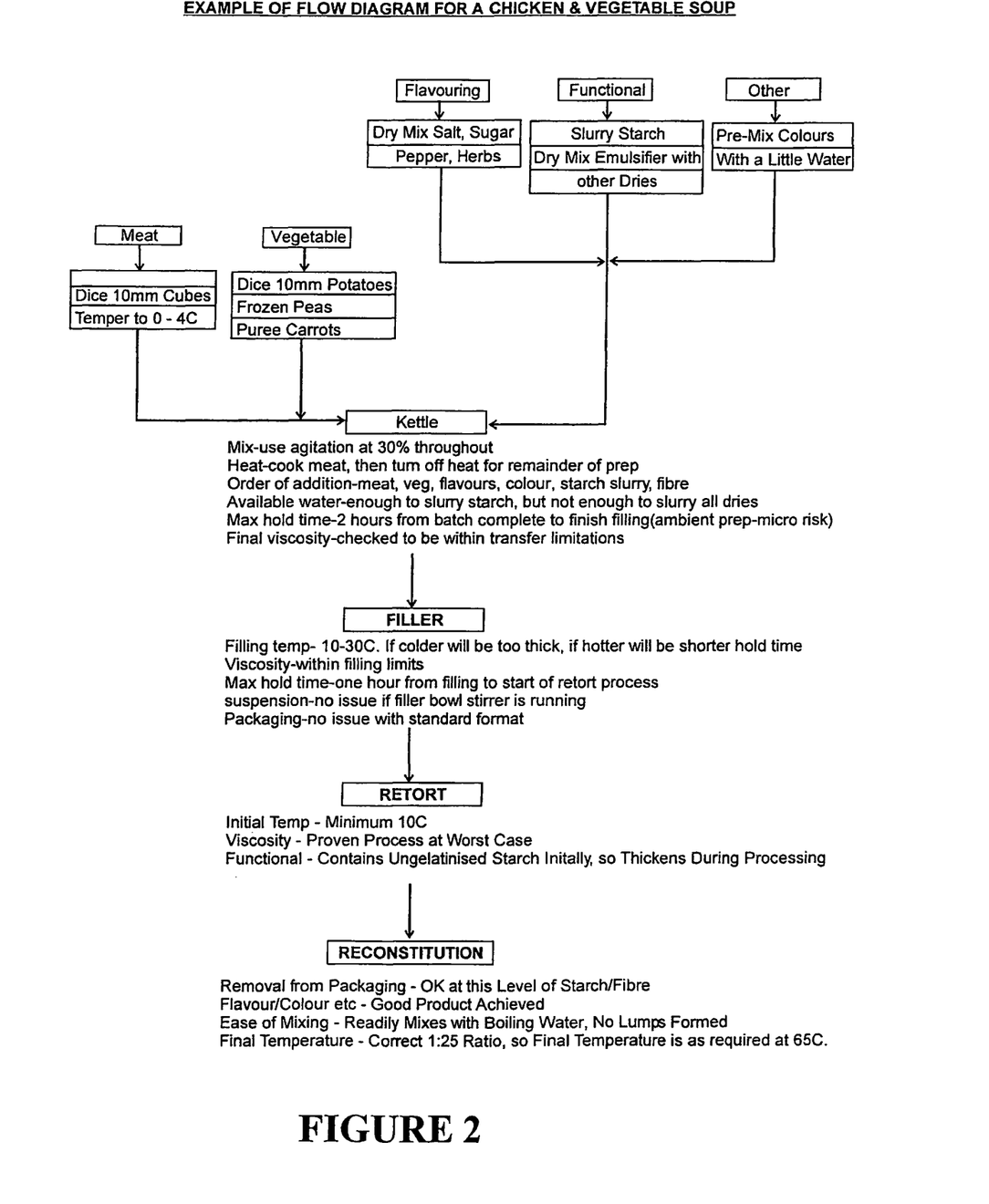
FIG. 2 is an example of that process for a chicken and vegetable soup.

FIG. 2 shows a preferred flow diagram for a chicken and vegetable soup.

The contents of FIGS. 1 and 2 are here included by way of reference.

EXAMPLE 1

Tomato Soup

Ingredients: Concentrated Tomatoes (85%) (contains 394 g of tomatoes per 100 g), sugar, onions, salt, herbs (including Basil), butter, acidity regulator (Sodium Bicarbonate), black pepper, spice.

The instructions [as also for the other examples] to be included on the container is preferably to 1. Squeeze contents of sachet gently into 300 ml mug.
2. Add boiling water, filling mug half way and stir for 10-15 seconds.
3. Fill to the top with further boiling water, stir again and enjoy.

Nutrition Information
Servings per package: 1
Serving size: 300 g* (i.e. when diluted with boiling water to 300 ml)

|  | AVG Quantity Per Serving | AVG Quantity Per 100 g |
|---|---|---|
| Energy | 360 kj | 120 kj |
| Protein | 2.5 g | 0.8 g |
| Fat, Total | 1.1 g | 0.4 g |
| Saturated | 0.6 g | 0.2 g |
| Carbohydrate | 14.5 g | 4.8 g |
| Sugars | 12.4 g | 4.1 g |
| Dietary Fibre | 3.0 g | 1.0 g |
| Sodium | 1110 mg | 370 mg |
| Lycopene | 23.9 mg | 8.0 mg |

EXAMPLE 2

Creamy Corn and Chicken

Ingredients: Corn (69%), water, chicken (7%), red pepper, chicken flavour (contains wheat, milk, flavour enhancer (621)), Tapioca Thickener (1442), sugar, salt, parsley.

| Nutrition Information<br>Servings per package: 1<br>Serving size: 300 g* (i.e. when diluted with boiling water to 300 ml) | | |
| --- | --- | --- |
| | AVG Quantity<br>Per Serving | AVG Quantity<br>Per 100 g |
| Energy | 3750 kj | 125 kj |
| Protein | 4.2 g | 1.4 g |
| Fat, Total | 1.5 g | 0.5 g |
| Saturated | 0.5 g | 0.2 g |
| Carbohydrate | 12.9 g | 4.3 g |
| Sugars | 2.3 g | 0.8 g |
| Dietary Fibre | 2.8 g | 0.9 g |
| Sodium | 1130 mg | 375 mg |

EXAMPLE 3

Spicy Thai Noodle Soup

Ingredients: Water, vegetables (onions, carrots, peas, red pepper, potatoes), wheat pasta (24%), herbs (lemongrass, Coriander, parsley), red chillies, chicken flavours (contain milk, sesame oil, flavour enhancers (621, 627, 631)), dietary fibre (citrus fibre), yeast extract, salt, sugar, natural onion flavour, white pepper, colours (160, 101), soy oil, traces of egg & barley.

| Nutrition Information<br>Servings per package: 1<br>Serving size: 300 g* (i.e. when diluted with boiling water to 300 ml) | | |
| --- | --- | --- |
| | AVG Quantity<br>Per Serving | AVG Quantity<br>Per 100 g |
| Energy | 360 kj | 120 kj |
| Protein | 2.5 g | 0.8 g |
| Fat, Total | 1.1 g | 0.4 g |
| Saturated | 0.6 g | 0.2 g |
| Carbohydrate | 14.5 g | 4.8 g |
| Sugars | 12.4 g | 4.1 g |
| Dietary Fibre | 3.0 g | 1.0 g |
| Sodium | 1110 mg | 370 mg |
| Lycopene | 23.9 mg | 8.0 mg |

EXAMPLE 4

Minestrone

Ingredients: Concentrated tomatoes, wheat pasta, carrots, potatoes, green beans, sugar, salt herbs, yeast extract, spinach, white wine vinegar, cheese, acidity regulator (sodium bicarbonate), traces of fish, egg & barley.

| Nutrition Information<br>Servings per package: 1<br>Serving size: 300 g* (i.e. when diluted with boiling water to 300 ml) | | |
| --- | --- | --- |
| | AVG Quantity<br>Per Serving | AVG Quantity<br>Per 100 g |
| Energy | 405 kj | 130 kj |
| Protein | 4.0 g | 1.3 g |
| Fat, Total | 0.6 g | 0.2 g |
| Saturated | 0.2 g | 0.1 g |
| Carbohydrate | 16.7 g | 5.6 g |
| Sugars | 9.4 g | 3.1 g |
| Dietary Fibre | 3.2 g | 1.1 g |
| Sodium | 885 mg | 295 mg |
| Lycopene | 22.0 mg | 7.3 mg |

What we claim is:

1. A retorted or heat treated soup concentrate product comprising:
a sealed pouch container,
a single serving volume of liquid soup concentrate, disposed and retorted or heat treated within the sealed container, and dilutable, after being expressed, poured, or otherwise removed from the container once the sealed container is opened, by a volume of boiling or near boiling water greater than the volume of liquid soup concentrate to form a ready to serve soup without further heating,
wherein the liquid soup concentrate comprises a food stuff or food stuff flavoring, or both, that has not been processed to a dry powder form, the concentrate within the sealed container has a weight of from 50 g to 100 g, and the soup has a single serving volume less than 400 ml consumable immediately after dilution.

2. The product of claim 1 wherein the concentrate is or includes a puree and/or broth.

3. The product of claim 1 wherein the concentrate has been cold or cool at ambient temperature(s) filled into the container prior to sealing.

4. The product of claim 1 wherein the container bears instructions to dilute the content of the container with boiling or near boiling water to provide said soup.

5. The product of claim 1 wherein the concentrate contains as a texturiser and/or thickener at least one of (i) a suitable starch and/or starch derivative and (ii) a suitable fruit and/or vegetable fibre.

6. The product of claim 1 wherein the concentrate contains water.

7. The product of claim 1 wherein the concentrate without further heating and at an ambient temperature within the range 10 to 30° C. is dilutable by boiling water or near boiling water to obtain a substantially lump free soup having a volume within the range of from 200 to 350 ml at a temperature of at least 55° C.

8. The product of claim 1 wherein the concentrate contains a starch and/or starch derivative, wherein the concentrate without further heating and at an ambient temperature within the range 10 to 30° C. is dilutable by boiling water in a volume in excess to that of the concentrate thereby obtaining a substantially lump free soup having a volume less than 400 ml at a temperature of between 55° C. and 75° C.

9. The product of claim 1 wherein the concentrate within the sealed container has a weight of from 70 g to 100 g.

10. The product of claim 9 wherein that weight is from 80 g to 90 g.

11. The product of claim 10 wherein that weight is about 85 g.

12. The product of claim 1 wherein the concentrate is diluted with a volume of boiling or near boiling water to a dilution ratio of water to concentrate of 1.5:1 or higher.

13. The product of claim 12 wherein the dilution ratio of water to concentrate range is not above 5:1.

14. The product of claim 13 wherein the dilution ratio of water to concentrate is at least 1.9:1.

15. The product of claim 12 wherein the dilution ratio of water to concentrate is in the range of 1.9:1 to 2.5:1.

16. The product of claim 12 wherein the dilution ratio is from 1.5:1 to 2.5:1.

17. The product of claim 1 wherein the volume of soup is from 200 to 350 ml.

18. The product of claim 1 wherein the volume of soup is from 250-300 ml.

19. The product claim 1 wherein the concentrate contains a suitable starch or starch derivative.

20. The product of claim 1 wherein the concentrate contains a suitable fruit and/or vegetable fibre.

21. The product of claim 20 wherein the suitable fruit and/or vegetable fibre comprises at least one of (a) a dry citrus fibre (b) a tomato fibre, and/or (c) a vegetable fibre.

22. The product of claim 1 wherein the concentrate contains a viscosity and/or perceived viscosity increasing agent(s) selected from one or more the following:
  Native starch or starches,
  Physically modified starch or starches,
  Chemically modified starch or starches,
  Starch or starches originating from Wheat, Potato, Corn, Waxy Maize and/or Tapioca,
  Locust Bean Gum,
  Pectins,
  MCC,
  CMC,
  Guar Gum,
  Citrus Fibre,
  Pea Flour,
  Pumpkin Powder,
  Dried fibres originating from cereals, vegetables and/or fruits,
  Fat mimetic,
  Apple pomace, and
  Wet vegetable purees.

* * * * *